S. J. JACKMAN.
VEHICLE DIRECTION INDICATOR.
APPLICATION FILED JAN. 31, 1916.

1,233,479.

Patented July 17, 1917.

Witnesses:

Inventor
Sanford J. Jackman
By Frederick Whyte
atty

UNITED STATES PATENT OFFICE.

SANFORD J. JACKMAN, OF SANTA ANA, CALIFORNIA.

VEHICLE DIRECTION-INDICATOR.

1,233,479.   Specification of Letters Patent.   Patented July 17, 1917.

Application filed January 31, 1916. Serial No. 75,241.

*To all whom it may concern:*

Be it known that I, SANFORD J. JACKMAN, a citizen of the United States, residing at Santa Ana, in the county of Orange and State of California, have invented a new and useful Vehicle Direction-Indicator, of which the following is a specification.

This invention relates to a direction indicator for vehicles and the primary object is to provide a simply constructed and inexpensive direction indicator in the form of an attachment which may be operated to effectively indicate whether the driver of the vehicle to which it is attached, is to make a right or a left turn.

An important object of this invention is to provide a device of the character described which comprises indicating means adapted to project from opposite sides of the vehicle to which it is attached, and which will take up little room and be in an out-of-the-way position when not in operation.

Another object is to generally improve and simplify the construction and operation of the devices of the above mentioned character so as to render them more practical and inexpensive to manufacture.

Other objects and advantages may appear from the subjoined detail description.

The accompanying drawings illustrate the invention.

Figure 1:
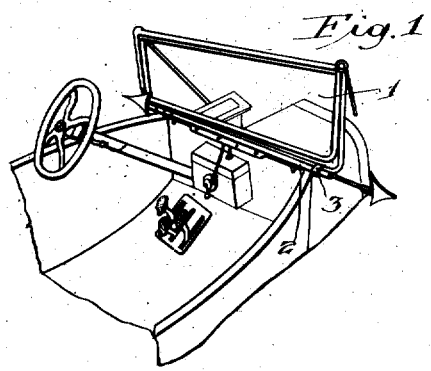
Figure 1 represents a fragmentary perspective view of an automobile showing the indicating device attached to the wind shield and in position to indicate that a right turn is to be made.
Figure 2:
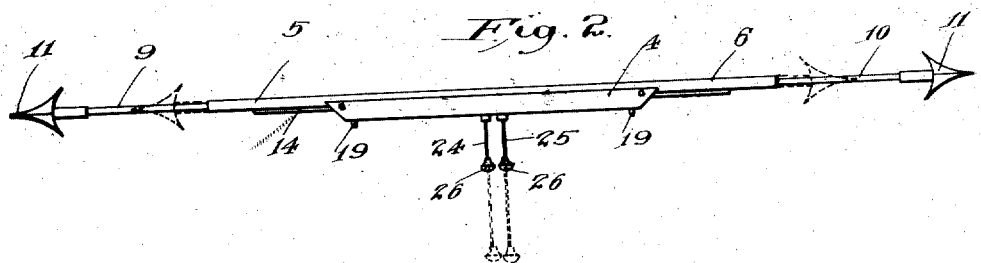
Fig. 2 is a top plan view of the device.
Figure 3:
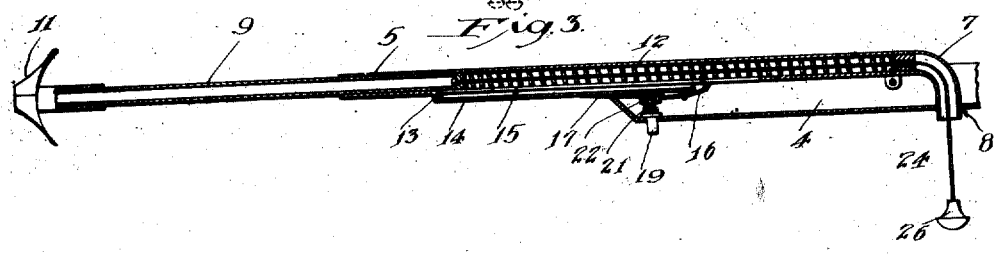
Fig. 3 is an enlarged longitudinal sectional view of one of the plungers and coöperating parts.
Figure 4:
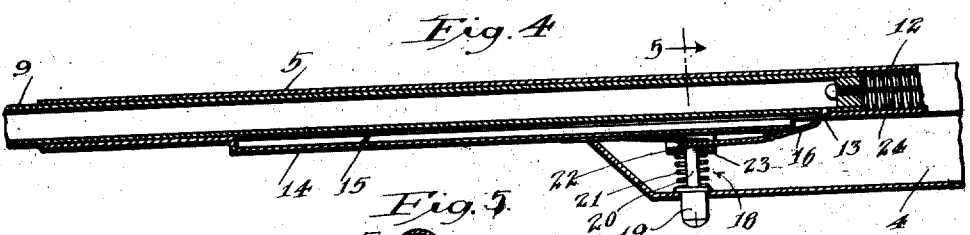
Fig. 4 is an enlarged fragmentary longitudinal sectional view of the device.
Figure 5:
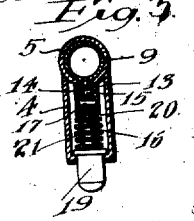
Fig. 5 is a sectional view on line 5—5 of Fig. 4.

Referring to the drawings, 1 designates the windshield of an automobile, and 2 my direction indicator which is attached in any suitable manner as at 3 to the lower side of the windshield.

The indicator comprises a casing 4 which is secured in any suitable manner in a horizontal position along the lower side of the windshield. Secured to the casing 4 and extending partly therein are tubular housings 5 and 6, the inner ends of which terminate at the center of the casing 4, are curved inwardly as at 7 and extend through openings 8 formed in the casing 4. These housings 5 and 6 project beyond the ends of the casing 4 and the sides of the wind shield 1 of the vehicle a slight distance.

Slidably mounted within the housings 5 and 6 are indicator plungers 9 and 10 upon the outer ends of which are carried pointer members 11 in the form of arrow heads. Expansion springs 12 are mounted within the housings 5 and 6 and at their outer ends engage the inner ends of the plungers 9 and 10, while their inner ends are suitably fastened to the housings.

The springs tend to force the plungers 9 and 10 outwardly from the housings 5 and 6, and upon their inner ends the plungers 9 and 10 are provided with pins 13 which slide in guideways 14 therefor formed on the housings 5 and 6. At the inner ends of the guideways the housings are provided with longitudinal openings 15 through which the pins 13 project and in which said pins slide.

Pivoted upon each of the housings intermediate their ends at the inner ends of the guideways 14 are catch members 16, the inner ends of which are adapted to engage with and hold the pins 13 when the springs 12 are compressed and the plungers are within the housings 5 and 6. Leaf springs 17 are fastened to the housings 5 and 6 and engage the inner faces of the catch members to hold them in position for coöperation with the pins 13. Trigger means 18 for moving the catch members out of pin-holding position are provided adjacent to the ends of the casing 4 and comprise push buttons 19 having plungers 20 thereon engaging with the spring-pressed ends of the catch members 16. Springs 21 hold the trigger means 18 in position for operation and when the buttons 19 are pushed inwardly the catch members release the pins 13 and allow the springs 12 to move the plungers 9 and 10 into extended indicating position.

Mounted on the housings 5 and 6 are guide members 22 which have openings 23 therein slidably receiving and guiding the plungers 20 into engagement with catch members 16.

In order to set the plungers 9 and 10 there are provided flexible elements 24 and 25 which are connected with the inner ends of the plungers 9 and 10, and extend through the springs, curved ends of the housings and out through the openings 8. On their free ends the flexible elements are provided with knobs 26 which are to be grasped when pulling the elements to set the plungers.

In operation, assuming that the vehicle is to be turned to the right, the right-hand push button 24 is pressed, releasing the spring 12 for the plunger 9 and the plunger 9 is extended into indicating or signaling position, as shown in Fig. 1 of the drawings. The device is accessible to the driver of the vehicle and may be operated either by pressure on the push buttons from the hand or foot of the driver. The signaling for a left turn is had by pressing the push button at the left-hand end of the casing 4. The plungers extend outwardly from the sides of the vehicle sufficiently far to be plainly seen from the rear and the pointers on the ends thereof are painted a bright color, for example red, so as to attract attention. By pulling on the flexible element of the plunger that has been extended said plunger may be set or "cocked" for another operation.

I claim:

1. In a vehicle direction indicator, a casing, housings carried by and extending oppositely from the casing, indicating plungers slidably mounted within the housings, expansion springs mounted within the housings and adapted to force the plungers into extended position, spring-pressed catch members carried by the housings, pins carried by the plungers and adapted to engage with the catch members to hold the plungers in set position against the action of the springs, said housings having offset guideways for the pins, and means operable exteriorly of the casing for moving the catch members out of engagement with the pins.

2. In a vehicle direction indicator, a casing, housings carried by and extending oppositely from the casing, indicating plungers slidably mounted within the housings, expansion springs mounted within the housings and adapted to force the plungers into extended position, spring-pressed catch members carried by the housings, pins carried by the plungers and adapted to engage with the catch members to hold the plungers in set position against the action of the springs, means operable exteriorly of the casing for moving the catch members out of engagement with the pins, including buttons slidable within the casing and projecting outwardly therefrom, and flexible setting elements connected with the inner ends of the plungers and extending through the inner ends of the housings and casing.

3. A vehicle direction indicator comprising a casing, housings secured to the ends of and projecting outwardly parallel to and from offset ends of the casing, relatively long indicating plungers slidably mounted within the housings, said housings being curved at their inner ends and extending through one of the walls of the casing on the side of the casing facing the driver's seat, expansion springs mounted within the housings to extend the plungers into the indicating position, flexible elements connected with the inner ends of the plungers extending through the housings and out through the inner ends thereof, said housings having communication with the casing, means mounted within the casing to hold the plungers in housed position against the action of the springs, and means to release said holding means including push buttons carried by the casing and projecting outwardly through the wall thereof which is opposed to the driver's seat.

4. A direction indicator for vehicles comprising a casing, housings connected with the casing and extending parallel thereto from opposite ends thereof, said housings extending from the ends of the casing inwardly to points adjacent the center thereof and being curved and extending through the wall of the casing which is opposed to the driver's seat, indicating plungers slidably mounted within the housings, expansion springs within the housings to force the plungers into signaling position, flexible elements connected with the inner ends of the plungers, extending in the housings and out through the inner ends thereof, stop members for the members located adjacent the inner ends of the housings and being apertured to receive said flexible elements, means within the casing to hold the plungers in housed position, releasing means for said holding means mounted within the casing and including push buttons which extend through the wall of the casing that is opposed to the driver's seat of the vehicle.

Signed at Santa Ana, California, this 22d day of January, 1916.

SANFORD J. JACKMAN.

Witnesses:
 HERTHA EIHEEN,
 S. M. REINHAUS.